United States Patent [19]

Thorud

[11] 4,205,512
[45] Jun. 3, 1980

[54] ROTARY MULCHING MOWER

[75] Inventor: Richard A. Thorud, Bloomington, Minn.

[73] Assignee: The Toro Company, Minneapolis, Minn.

[21] Appl. No.: 931,267

[22] Filed: Aug. 4, 1978

[51] Int. Cl.² ........................................... A01D 55/18
[52] U.S. Cl. .................................... 56/13.4; 56/13.7; 56/255
[58] Field of Search ................ 56/320.1, 255, 17.5, 56/12.7, 13.4

[56] References Cited

U.S. PATENT DOCUMENTS

| | | | |
|---|---|---|---|
| 2,760,327 | 8/1956 | Boree | 56/13.4 |
| 2,786,318 | 3/1957 | Caldwell et al. | 56/13.7 |
| 2,836,024 | 5/1958 | Davis et al. | 56/13.7 |
| 3,481,124 | 12/1969 | Machovina | 56/255 |
| 3,959,954 | 6/1976 | Halsten | 56/12.8 |

*Primary Examiner*—Russell R. Kinsey
*Attorney, Agent, or Firm*—Merchant, Gould, Smith, Edell, Welter & Schmidt

[57] ABSTRACT

A rotary mulching mower having a housing which defines a cutting chamber and has a kicker mounted therein to direct grass clippings generally downward into the cutting path. A cutting blade is mounted to the housing and disposed within the cutting chamber for rotation about a generally vertical axis. The cutting chamber is generally cylindrical and in the preferred embodiment a plurality of kickers are mounted within the chamber and spaced apart about its circumference. The mower has a central deck that encloses the cutting chamber and a rear deck with vertical sidewalls that taper rearwardly from the central deck to a rear wall.

14 Claims, 7 Drawing Figures

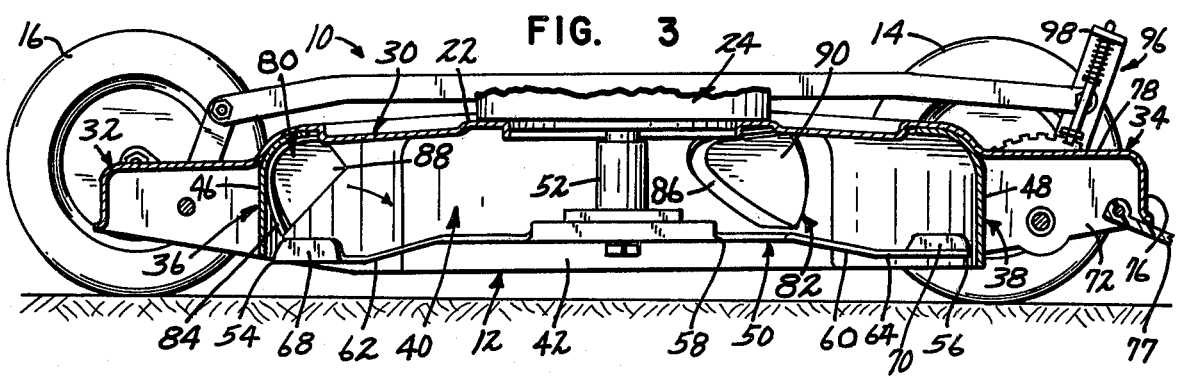
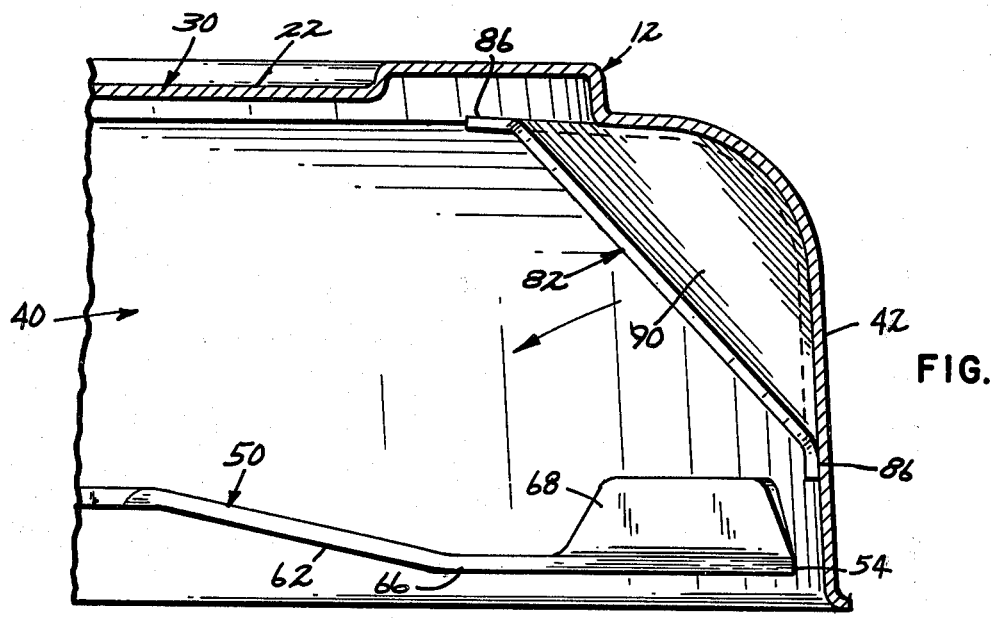
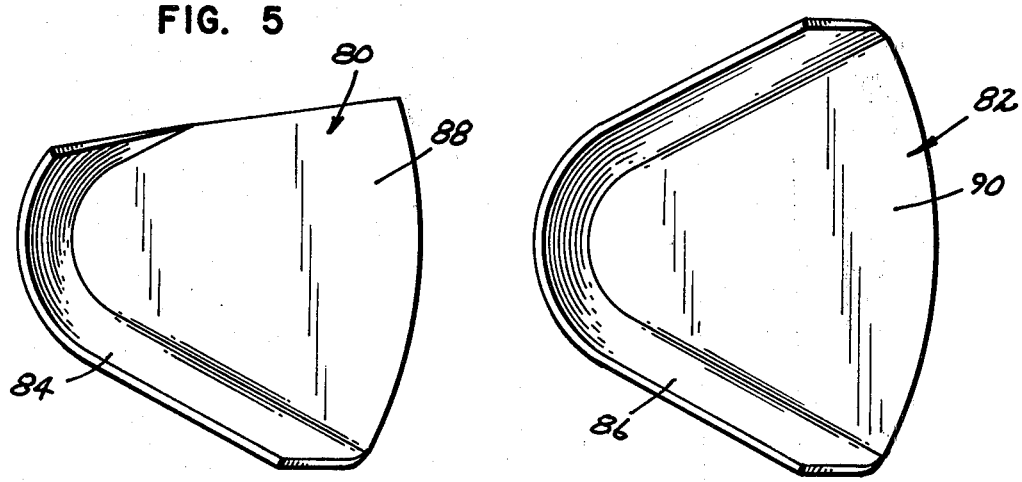

ROTARY MULCHING MOWER

BACKGROUND OF THE INVENTION

The present invention relates broadly to rotary lawn mowers and in particular to rotary mulching mowers.

A rotary mower may be generally defined as a mowing implement with a cutting blade mounted for rotation about a substantially vertical axis to define a generally horizontal rotary cutting path. Two basic types of rotary mowers can be characterized as bagging and mulching mowers. In the conventional bagging rotary mower, the objective is to collect the grass clippings as the grass is cut and remove substantially all of the grass clippings from the lawn. In the case of bagging mowers, the mower housing which defines the cutting chamber in which the blade is disposed, is designed to ingest and discharge significant amounts of air to carry suspended clippings into a collection device. The housing is streamlined in the cutting chamber region to provide adequate airflow to discharge and collect the clippings.

The objective of the mulching mower is contrary to bagging mower theory in that the mulching mower is designed to bury the grass clippings and other organic lawn debris deep into the lawn. The clippings are preferably disposed beneath the surface of the cut grass and therefore will not leave an unsightly deposit on the top of the lawn. Additionally, with the clippings near the ground where it would typically be relatively damp, micro-organisms will feed on the clippings and decompose the clippings. The clippings thus serve as a soil nutrient.

In mulching it is desirable to cut the clippings to as short a length as possible to ensure that the clippings are small enough to be driven beneath the surface of the lawn. It is also desirable to violently agitate the grass as it is being cut to again facilitate deposit of the clippings below the lawn surface. Mulching mowers generally provide a deep deck housing in which the clippings are suspended such that clippings may be cut several times before they are deposited into the cut path. Since the mulching mower is not designed with a specific air discharge port, the housing must be designed such that there is a balance between the air intake and air discharge. It has been found that the quality of cut will be dependent upon the air balance between intake and discharge from the mulcher cutting chamber.

The conventional prior art mulchers have encountered some difficulty in achieving optimum deposit of the grass clippings beneath the lawn surface when the lawn is cut with the grass relatively long or lush. Specifically, the conventional mulcher designs leave unsightly clippings on the top of the lawn under these conditions. The clippings may be deposited in windows along each side of the cut path of the mulching mower. In addition to having a displeasing aesthetic effect, the clippings that are left deposited on the lawn surface are not in the area where they can be decomposed to return nutrients to the soil. Therefore, with the prior art mulching mowers the operator must be extremely careful that he either continually cut the grass when it reaches a certain height or that each time he cuts he adjust the height of cut of the mower such that the clippings will be short enough to be deposited beneath the lawn surface. Under heavy growing conditions, much more frequent cutting of the lawn is required in the prior art mulching mowers.

It is desirable, therefore, to have a mulching mower that will perform under a variety of lawn conditions to include relatively long or lush grass. The present invention is such a rotary mulching mower that buries the clippings beneath the lawn surface even when the grass is relatively long and lush. This range of operation of the present invention is achieved in part by the provision of kickers or baffles within the cutting chamber that essentially disrupt the stream of grass clippings suspended therein and directs the clippings generally downward into the cut path and inward with respect to a substantially vertical rotational axis of the cutting blade. The kickers in combination with the housing and blade design thereby provide optimum clipping dispersion under varying lawn conditions. The housing of the rotary mulching mower of the present invention is also designed such that the air intake and air discharge are sufficiently balanced to improve the quality of cut and in addition to facilitate distribution of the clippings uniformly across the cut path of the mower.

SUMMARY OF THE INVENTION

The present invention is a rotary mulching mower that includes a housing that defines a cutting chamber. The housing has ground engaging wheels rotatably affixed thereto for supporting the housing above the ground surface. The cutting blade is disposed within the cutting chamber for rotation about a generally vertical axis. The cutting blade thereby defines a generally horizontal cutting path. Means are mounted on the housing and connected to the cutting blade for rotatably driving the cutting blade. A kicker is mounted to the housing within the cutting chamber and is disposed in the path of grass clippings to direct the clippings generally downwardly into the cutting path of the blade. The present invention is also a rotary mulching mower and includes a housing with a central deck member that defines a generally cylindrical cutting chamber. Ground engaging wheels are rotatably mounted to the housing such that a bottom edge of the central deck member is disposed above the ground surface. A rear deck member extends from the central deck member and has vertically disposed sidewalls that taper upwardly from the bottom edge of the central deck member to a rear wall. A cutting blade is disposed within the cutting chamber also for rotation about a substantially vertical axis with the cutting blade defining a generally horizontal cutting path. Finally, means are mounted atop the central deck member and connected to the cutting blade for rotatably driving the cutting blade.

In the preferred embodiment, a pair of kickers are disposed circumferentially about the housing within the cutting chamber. The kickers are substantially planar plate members disposed vertically within the housing above the horizontal cutting path defined by the blade. The planar plate members are affixed to vertically disposed sidewalls of the housing and extend upward toward a top wall of the housing and inward in a direction toward the vertical rotational axis of the cutting blade. The cutting blade is provided with a sail member which extends upward from the top surface of the blade at each end thereof. The sail members serve to generate turbulent airflow within the cutting chamber to violently agitate the grass as it is being cut. The sail members also strike the clippings imparting to the clippings a generally circular flow within the housing. The turbulent airflow maintains the clippings suspended and the cutting blade is provided with extended cutting surfaces that increase the chances of cutting each clipping a plurality of times. The kickers are struck by clippings swirling within the cutting chamber and are directed by the kickers generally downward into the cutting path and inward with respect to the rotational axis of the blade.

The number of kickers that are utilized in the present invention may vary in accordance with the mower housing and blade design. In the embodiment disclosed herein, a pair of kickers are utilized and are positioned about the inner circumference of the housing. The pair of kickers are spaced apart such that one kicker substantially prevents windrowing along one side of the housing while the other kicker substantially prevents windrowing along the opposite side of the housing. The rear deck with upwardly tapering sidewalls provides for balanced airflow into and out of the housing in addition to facilitating a uniform distribution of the clippings along the cut path. In the present invention, as the amount of grass being cut increases as a result of increased length and/or thickness of the grass, the kickers correspondingly increase the amount of clippings that can be buried beneath the grass surface. The present invention therefore increases the range of conditions in which the mulching mower will function. The aesthetic appearance of the lawn is improved and there is a maximum replacement of nutrients to the soil through the decomposition of the clippings. These and other advantages of the rotary mulching mower of the present invention will become apparent with reference to the accompanying drawings, detailed description of the preferred embodiment, and claims.

BRIEF DESCRIPTION OF THE DRAWINGS

FIG. 3 is a sectional view taken generally along the line 3—3 of FIG. 1;

FIG. 4 is an enlarged fragmentary sectional view taken generally along the line 4—4 of FIG. 2;

FIG. 5 is an enlarged elevational view of one of the kickers of the preferred embodiment of the present invention;

FIG. 6 is an enlarged elevational view of the other of the kickers of the preferred embodiment of the present invention;

DETAILED DESCRIPTION OF THE PREFERRED EMBODIMENT

Figure 1:
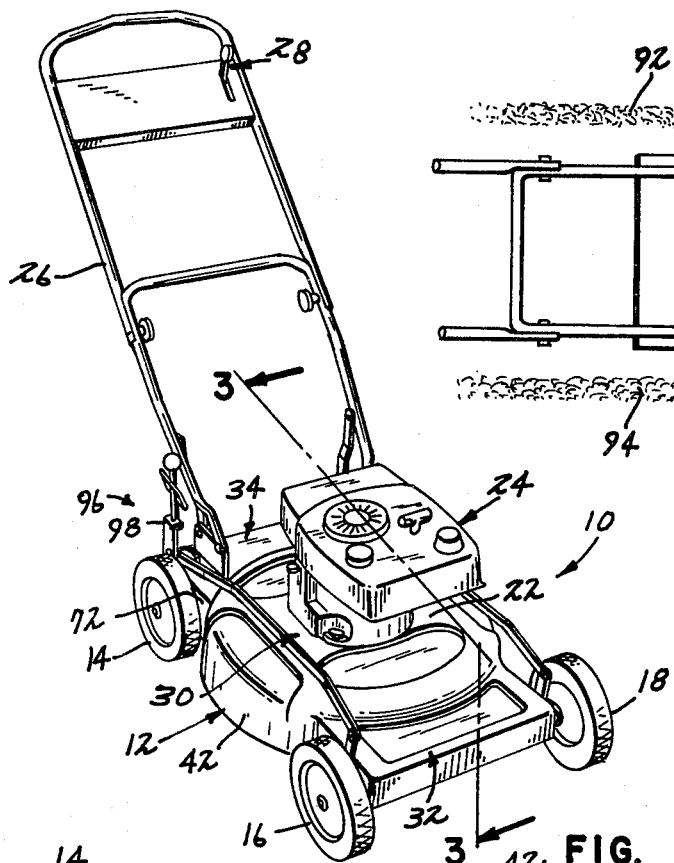
FIG. 1 is a view in perspective of the rotary mulching mower of the present invention.

Referring to the drawings, wherein like numerals represent like parts throughout the several view, the mulching mower of the present invention as illustrated in FIG. 1 is designated generally as 10. Mower 10 includes a housing 12 to which is mounted a plurality of ground engaging wheels 14, 16, 18 and 20 which support housing 12 above the ground surface. Housing 12 has a top surface 22 on which is mounted a conventional internal combustion engine 24. In the embodiment illustrated herein, engine 24 is disclosed as a gasoline engine, however, it is understood that it is contemplated within the spirit and scope of the present invention to provide alternative equivalent driving means, such as an electrically powered motor. Mounted to housing 12 at the rear thereof is a generally vertically and rearwardly extending operator handle 26. Affixed to handle 26 may be the mower controls designated generally as 28.

Referring in particular to FIGS. 3 and 4, the details of the structure of housing 12 will now be described. Housing 12 has a central deck 30, a front deck 32 and a rear deck 24. Front and rear cutting chamber enclosure members 36 and 38 are affixed to housing 12 to define a generally cylindrical cutting chamber 40. Central deck 30 has sidewalls 42 and 44 to which members 36 and 38 may be affixed, by any convenient means, such as welding. Members 36 and 38 have generally vertical walls 46 and 48 which in conjunction with the generally vertical sidewalls 42 and 44 enclose chamber 40. Sidewalls 42 and 44 and vertical walls 46 and 48 are substantially cylindrical in form each having a substantially equivalent radius of curvature measured with respect to a central axis of deck 30. The vertical dimension of sidewalls 42 and 44 and vertical walls 46 and 48 are also substantially equal and are sized to define a relatively deep cutting chamber 40 in comparison with bagging mowers wherein the grass clippings are discharged from the cutting chamber and collected as opposed to being driven to the ground.

Figure 2:
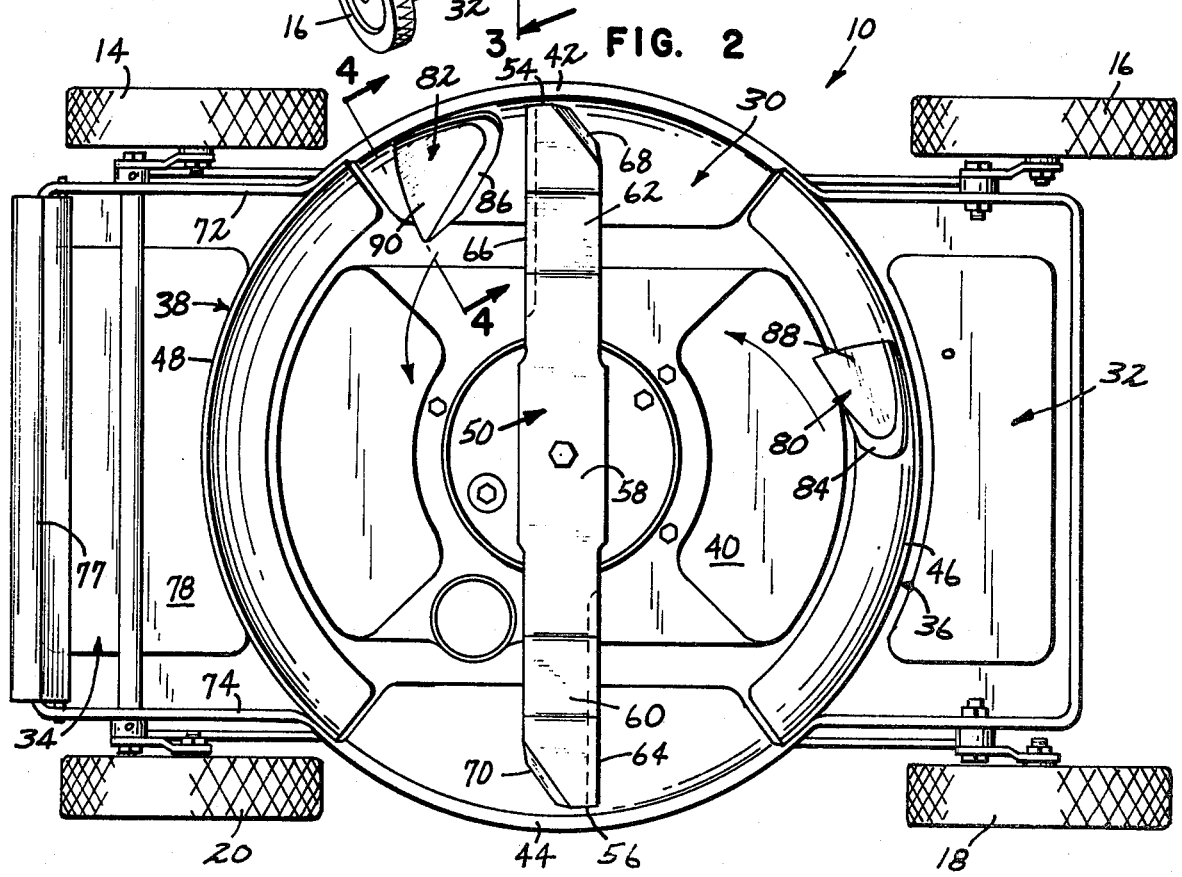
FIG. 2 is an enlarged bottom plan view of the mower shown in FIG. 1.

Mounted to housing 12 for rotation about a substantially vertical axis within chamber 40 is a cutting blade 50. Blade 50 is secured to a vertically disposed shaft 52 which is driven by engine 24. Blade 50 has a radius slightly smaller than the radius of curvature of sidewalls 42 and 44 and vertical walls 46 and 48 to provide clearance between the tips 54 and 56 of blade 50 and the sidewalls 42 and 44 and vertical walls 46 and 48. With reference to the bottom plan view shown in FIG. 2, blade 50 is rotatably driven in a counterclockwise direction. Blade 50 has a central portion 58 and end portions 60 and 62. End portion 60 has a cutting edge 64 extending from tip 56 along one side of blade 50. End portion 62 has a cutting edge 66 extending from tip 54 along the side of blade 50 opposite the side on which cutting edge 64 is disposed. Cutting edges 64 and 66 are substantially longer than the cutting edges of conventional rotary mowers wherein the clippings are collected or bagged through discharge from the housing. Disposed at tips 54 and 56 of blade 50 are sail members 68 and 70 on the opposite side of the blade from cutting edges 64 and 66, respectively. Sail members 68 and 70 extend vertically upward with respect to blade 50 as shown in more detail in FIG. 4, typically at an angle of between 0° and 90° with respect to a generally horizontal plane containing the blade. It should be understood that in the embodiment disclosed herein, blade 50 is essentially a conventional prior art cutting blade with the exception of providing an extended cutting edge as at 64 and 66.

Rear deck 34 is formed integrally with central deck 30 and includes vertically disposed sidewalls 72 and 74 and a vertically disposed end wall 76. Rear deck 34 also has a topwall 78. As shown in more detail in FIG. 3, the bottom edge of side walls 72 and 74 of rear deck 34 taper upwardly at an angle with respect to the horizontal from central deck 32 to endwall 76. Rear deck 34, in conjunction with tilting of housing 12 as hereinafter defined, thereby defines a discharge outlet for air drawn into chamber 40 by the action of rotating blade 50 and in addition to facilitating the discharge of air from chamber 40 provides for a more even distribution of the grass clipping over the cutting path. Housing 12, and in particular that portion of the housing defining cutting chamber 40 is tilted from front to back with respect to the vertical such that the cutting path of blade 50 is slightly lower in the front half of cutting chamber 40 than in the rear half of cutting chamber 40. This tilt of the mower housing, which in the preferred embodiment can be approximately ½ inch from front to rear aids in providing the proper inflow of air into cutting chamber 40 about the bottom edge thereof in addition to facilitating the discharge of air drawn within chamber 40. Pivotally mounted to rear deck 34 proximate end wall 76 is a shield member 77 which extends substantially the entire width of end wall 76.

A pair of kickers 80 and 82 are mounted to housing 12 within chamber 40. Kickers 80 and 82 can be described as generally triangular in shape each having a flange 84 and 86 for affixing kickers 80 and 82 to housing 12 by any convenient means, such as welding. Kickers 80 and 82 have generally planar portions 88 and 90. Kickers 80 and 82 are disposed about the circumference of housing 12 such that planar portions 88 and 90 are in the path of the grass clippings and aligned to direct the grass clippings generally downward and inward of housing 12. With the particular blade design disclosed herein the preferred placement of kickers 80 and 82 are shown. Kickers 80 is affixed generally at the midpoint of chamber closure member 36. Kicker 82 is affixed along sidewall 42 proximate rear deck 34. The position of kickers 80 and 82 about the circumference of the cutting chamber 40 is a function of the design of blade 50 and is selected to eliminate windrowing along sides 42 and 44 of the mower as it traverses a cutting path.

As shown in more detail in FIG. 4, kickers 80 and 82 are vertically disposed above the cutting path of blade 50 and, as will be described in more detail hereafter, in the path of clippings suspended in chamber 40. Kickers 80 and 82 are mounted such that planar portions 88 and 90 lie generally in planes at 45 degree angles with respect to sidewall 42 and vertical wall 46, respectively. Kickers 80 and 82 are affixed to the top and side walls of housing 12 by flanges 84 and 86. It will be understood that it is within the spirit and scope of the present invention to provide more than two kickers 80 and 82 disposed about the circumference of housing 12 within chamber 40. The number and positioning of such kickers would be, in part, a function of the blade design and is selected to eliminate windrowing which is a common problem in the prior art mulching mowers.

Figure 7:
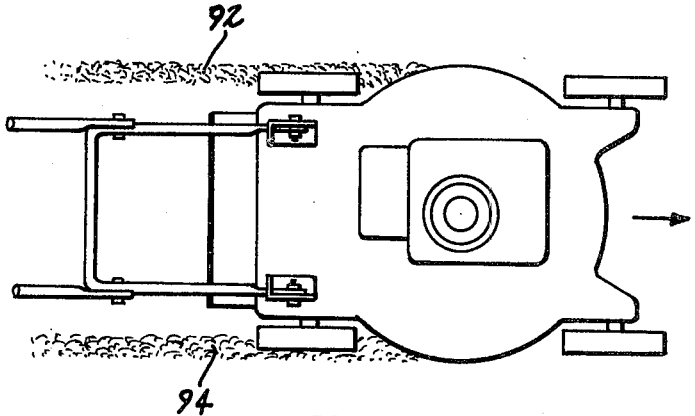
FIG. 7 is a plan view of a prior art rotary mulching mower showing the formation of windrows along the cut path.

The operation of the present invention will now be described. Referring first to FIG. 7, the problem of windrowing is illustrated. Specifically, FIG. 7 shows a prior art mulching mower moving in the direction shown by the arrow. In the prior art mulching mower, under relatively light cutting conditions (where the grass is neither too long nor too lush) the clippings will be adequately deposited beneath the surface of the grass. As the grass gets longer and thicker, however, the problems of dispersion of clippings deep into the cut path become significant. In particular, clippings will be left atop the cut path typically in windrows along the edges of the cut path as shown at 92 and 94 in FIG. 7. The provision of kickers within the cutting chamber in the present invention substantially eliminates the discharge and dispersion of clippings on the top of the cut path even in cutting relatively long and/or lush grass.

Blade 50 is, in the preferred embodiment, driven at speeds ranging between 2400-2900 RPM by engine 24. It is conventional in the prior art mulching mowers to utilize blade speeds that are the same as blade speeds generally found in bagging rotary mowers, however it has been found that it is preferred to utilize lower speeds in mulching applications. Rotating blade 50 creates a vacuuming action ingesting air within chamber 40 about the bottom edges of housing 12. Sails 68 and 70 on the tips 54 and 56 of blade 50 act as airfoils to aid in providing the proper amount of airflow into chamber 12 and to generate turbulence within chamber 12 maintaining clippings suspended therein whereby the clippings can be cut a number of times by blade 50. The vacuuming action and turbulence created by blade 50 also serves to agitate the grass beneath chamber 40. As the grass is agitated, the clippings can be more readily driven beneath the surface of the grass. The agitation of the grass also improves the quality of the cut as in a conventional bagging mower. Since the vacuuming action in the mulching mower is less than that in the conventional bagging mowers, the cutting edge of the blade is lengthened to provide more chances for each blade of grass to be cut. The clippings are suspended in chamber 40 generally above the cutting plane defined by blade 50. Sails 68 and 70, in addition to maintaining proper airflow and turbulence within chamber 40 also function to strike the clippings and impart to the clippings a circular flow component about the circumference of housing 12. The clippings will strike kickers 80 and 82 which, as shown by the arrows particularly in FIGS. 3 and 4, are disposed to deflect the clippings generally downward and inward with respect to the rotational axis of blade 50. The clippings are thus driven out of sight beneath the surface of the grass which is being agitated by the airflow in chamber 40.

In the embodiment illustrated herein, a pair of kickers 80 and 82 are disposed as previously described within housing 12. It was found that kicker 80 substantially eliminates windrowing along sidewall 42 while kicker 82 substantially eliminates windrowing along sidewall 44. As previously mentioned, the number and positioning of the kickers can be varied within the spirit and scope of the present invention and is determined in part by the particular blade design utilized. Similarly, the specific design of the kickers themselves may be modified as necessary.

Housing 12 has also been designed to provide balanced inflow and discharge of air within chamber 40. It is known that the quality of cut is diminished when the air intake is not properly balanced with air discharge. Therefore, housing 12 is tilted, as previously described, approximately ½ inch from front to back and rear deck 34 has a lower edge that tapers upwardly from central deck 30 to facilitate air discharge and a uniform distribution of clippings across the cut path of the mower.

Mower 10 is also provided with a height adjustment mechanism 96 which provides for simultaneous height adjustment of wheels 14, 16, 18 and 20. Mechanism 96 includes a manually operable lever 98 which is connected to all four wheels. Positioning of the lever 98 is thereby transmitted to each wheel raising and lowering the height of cut.

The present invention is disclosed with respect to a operator propelled mower. It should be understood that the present invention could also be utilized in a self-propelled mower. From the above description, it can be seen that the present invention is a mulching mower with effective clipping dispersion beneath the surface of the grass under a variety of cutting conditions. When the grass is cut when it is longer than optimum length, the kickers facilitate dispersion of the clippings substantially eliminating the problems in the prior art mulchers wherein unsightly clippings are deposited on the surface of the grass in the windrows along the cut path. The design of the mulcher housing serves to balance air intake and discharge and the tapering rear deck optimizes uniform clipping dispersion over the cut path.

What is claimed is:

1. A rotary mulching mower comprising:
   (a) a housing defining a cutting chamber, said housing having ground engaging wheels rotatably affixed thereto for supporting said housing above the ground surface;
   (b) a cutting blade disposed within said cutting chamber for rotation about a generally vertical axis, said cutting blade defining a generally horizontal cutting path;
   (c) means mounted on said housing and connected to said cutting blade for rotatably driving said cutting blade; and
   (d) a kicker member mounted to said housing within said cutting chamber said kicker member having a striking surface lying generally in a plane oblique with respect to said generally horizontal cutting path, and disposed in the path of grass clippings to deflect the clippings generally downwardly into said cutting path;
   whereby the clippings are deposited beneath the surface of the grass.

2. A rotary mulching mower in accordance with claim 1 wherein said housing has a top wall on which said driving means is mounted and generally vertically extending sidewalls, and wherein said kicker comprises a planar plate member positioned within said cutting chamber above a plane in which said generally horizontal cutting path lies.

3. A rotary mulching mower in accordance with claim 2 wherein said planar member is angularly disposed with respect to said vertically extending sidewalls of said housing.

4. A rotary mulching mower in accordance with claim 3 wherein said planar member extends generally inwardly with respect to the rotational axis of said cutting blade and forwardly with respect to the direction of rotation of said cutting blade.

5. A rotary mulching mower comprising:
   (a) a housing with ground engaging wheels rotatably mounted thereto, said housing further comprising:
      (i) a central deck member defining a generally cylindrical cutting chamber, said central deck member having a bottom edge disposed above the ground surface and about which air is ingested into said cutting chamber, said bottom edge defining a plane sloping downwardly and forwardly with respect to a forward direction of movement of the mower;
      (ii) a rear deck member extending from said central deck member and having vertically disposed sidewalls that taper upwardly from said bottom edge of said central deck member to a rear wall;
   (b) a cutting blade disposed within said cutting chamber for rotation about a substantially vertical axis, said cutting blade defining a generally horizontal cutting path; and
   (c) means mounted atop said central deck member and connected to said cutting blade for rotatably driving said cutting blade.

6. A rotary mulching mower in accordance with claim 5 comprising a kicker mounted to said housing within said cutting chamber and disposed in the path of grass clippings to direct the clippings generally downward into the cutting path of said blade.

7. A rotary mulching mower in accordance with claim 6 wherein said central deck member has a top wall on which is mounted said driving means and downwardly extending sidewalls, and wherein said kicker is a planar plate member positioned vertically above said horizontal cutting path and lying in a plane disposed at an angle with respect to said sidewalls.

8. A rotary mulching mower in accordance with claim 7 wherein said planar member is affixed to said sidewall and extends upward toward said topwall and inward with respect to the rotational axis of said cutting blade.

9. A rotary mulching mower comprising:
   (a) a deep deck housing defining a cutting chamber, said housing having ground engaging wheels rotatably affixed thereto for supporting said housing above the ground surface;
   (b) a cutting blade disposed within said cutting chamber for rotation about a generally vertical axis, said cutting blade defining a generally horizontal cutting path;
   (c) means mounted on said housing and connected to said cutting blade for rotationally driving said cutting blade; and
   (d) a plurality of generally planar kickers mounted to said housing within said cutting chamber and disposed circumferentially about said cutting path and in the path of grass clippings, said kickers mounted obliquely with respect to said generally horizontal cutting path and sloping downwardly, inwardly toward said generally vertical axis, and forwardly with respect to the direction of rotation of said cutting path to deflect clippings generally downward and inward into the cutting path of said blade.

10. A rotary mulching mower in accordance with claim 9 wherein said housing comprises a top wall on which is mounted said driving means and a vertically extending sidewall, and wherein said plurality of kickers comprises first and second planar plate members affixed to said sidewall and angularly spaced apart about the circumference of said cutting chamber, said planar plate members vertically disposed above the horizontal cutting path of said blade.

11. A rotary mulching mower in accordance with claim 10 wherein said housing has a central deck portion that defines said cutting chamber and a rear deck portion extending from said central deck portion, said rear deck portion having generally vertically disposed side walls that taper upwardly from the bottom edge of said central deck portion to a rear wall of said rear deck portion.

12. A rotary mulching mower in accordance with claim 11 wherein said first and second planar plate members extend upwardly towards said topwall of said housing and inwardly towards said vertical rotational axis of said blade.

13. A rotary mulching mower in accordance with claim 12 wherein said cutting blade comprises an elongated planar member having sail portions extending generally upward toward said top wall of said housing, said sail portions defining a striking surface to establish a circular flow of clippings within said housing.

14. A rotary mulching mower in accordance with claim 13 wherein said vertically extending side wall includes a front enclosure member and a right side portion with respect to a forward direction of movement of the mower, and wherein said first kicker is mounted to said front enclosure member and said second kicker is mounted to said right side portion.

* * * * *